United States Patent Office 3,425,569
Patented Feb. 4, 1969

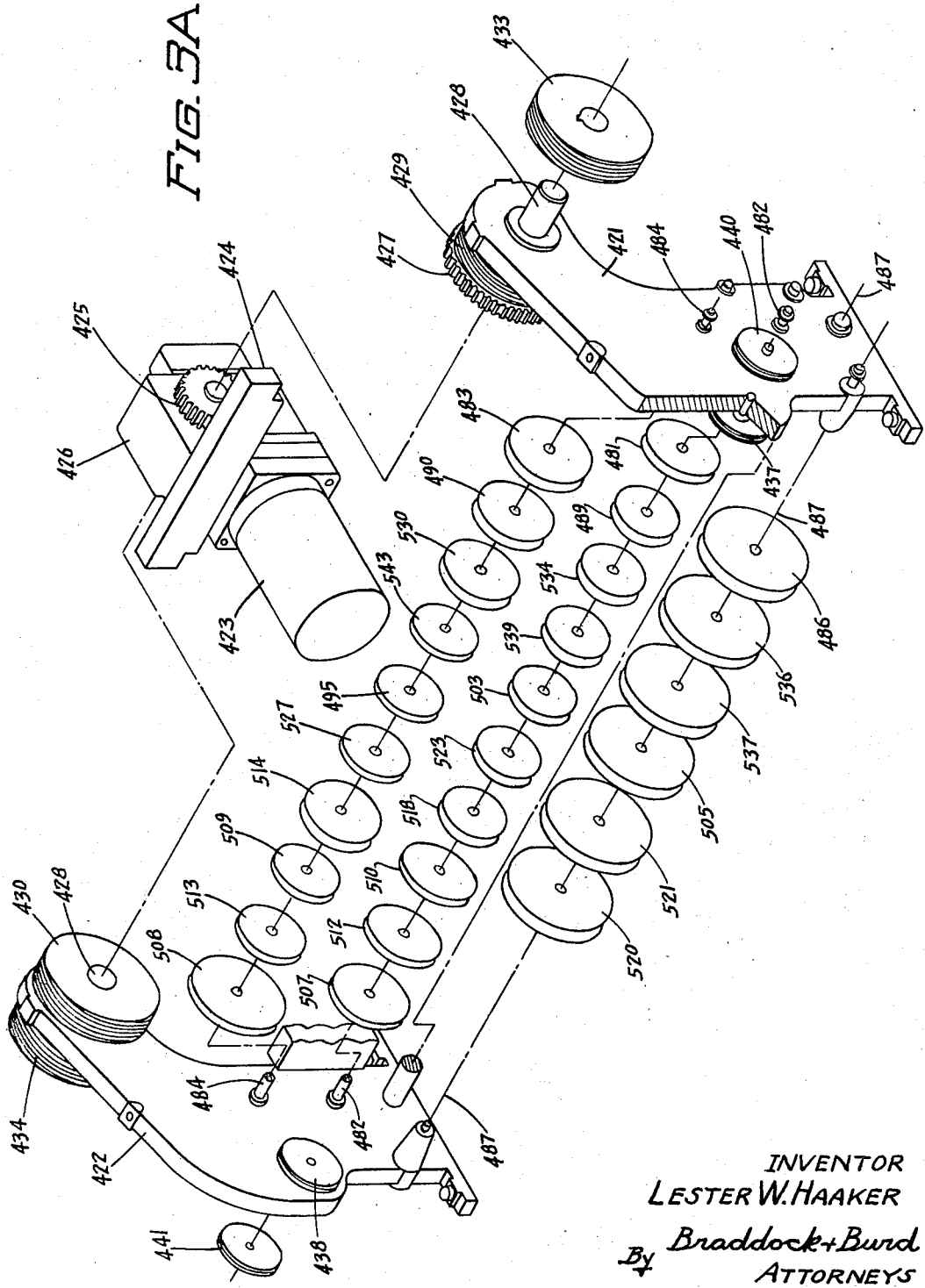
INVENTOR
LESTER W. HAAKER
By Braddock+Burd
ATTORNEYS

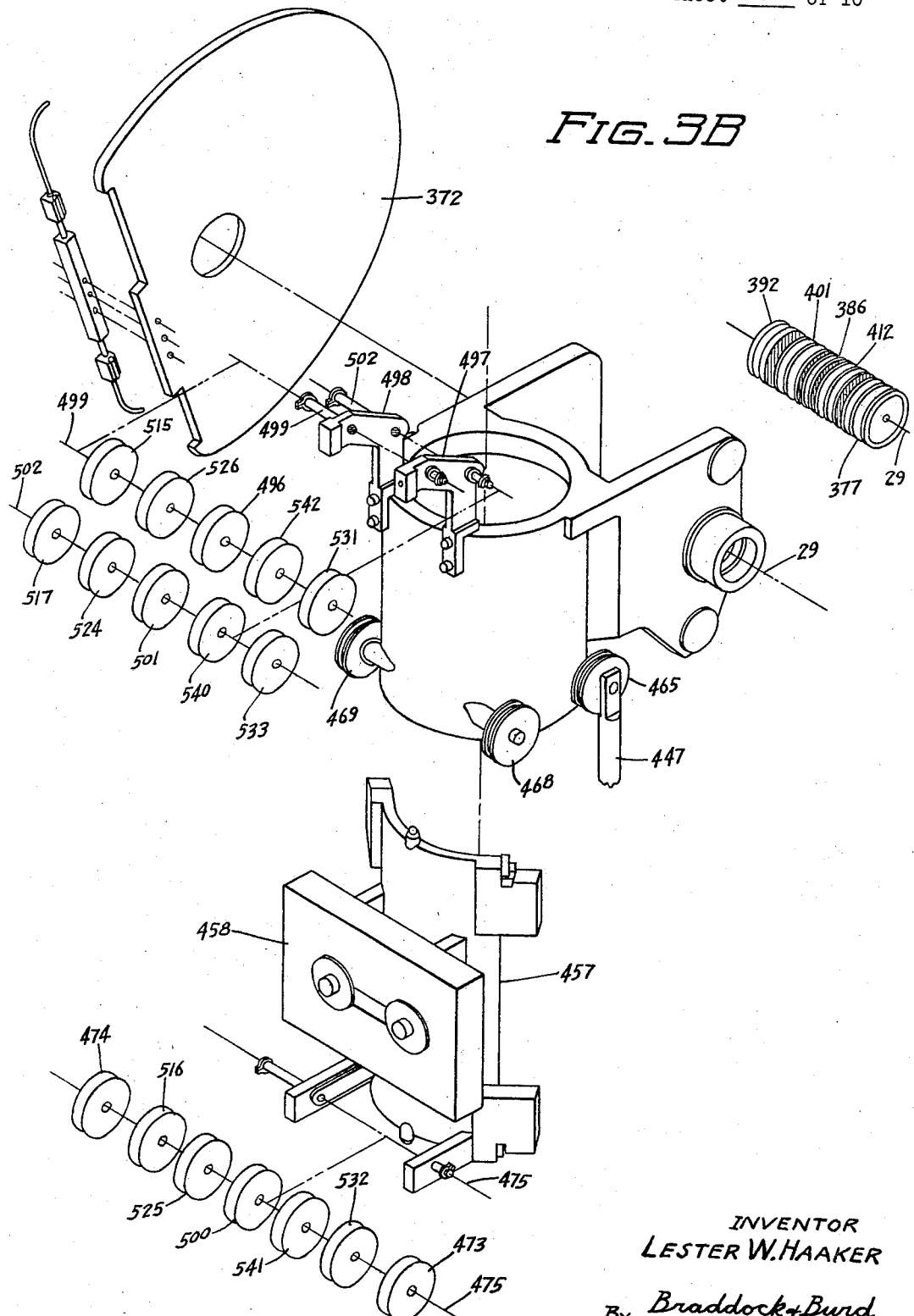

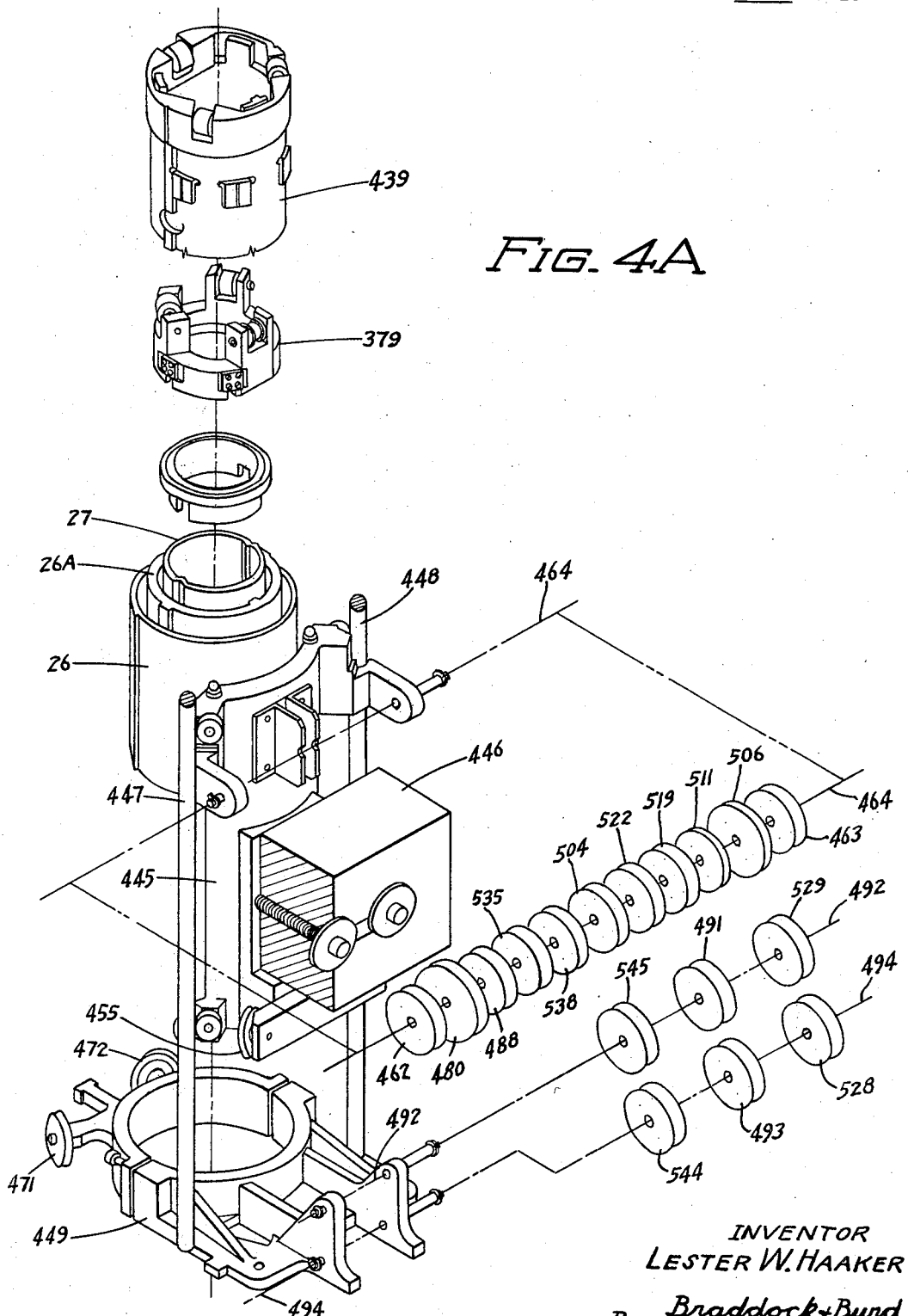

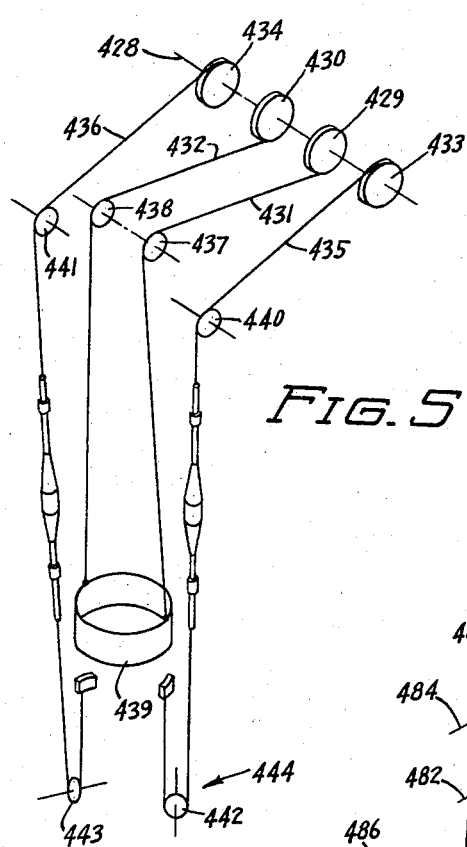
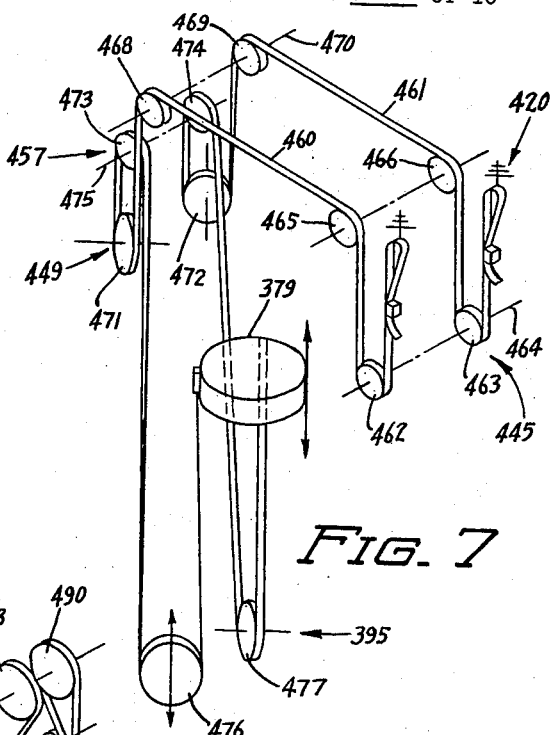
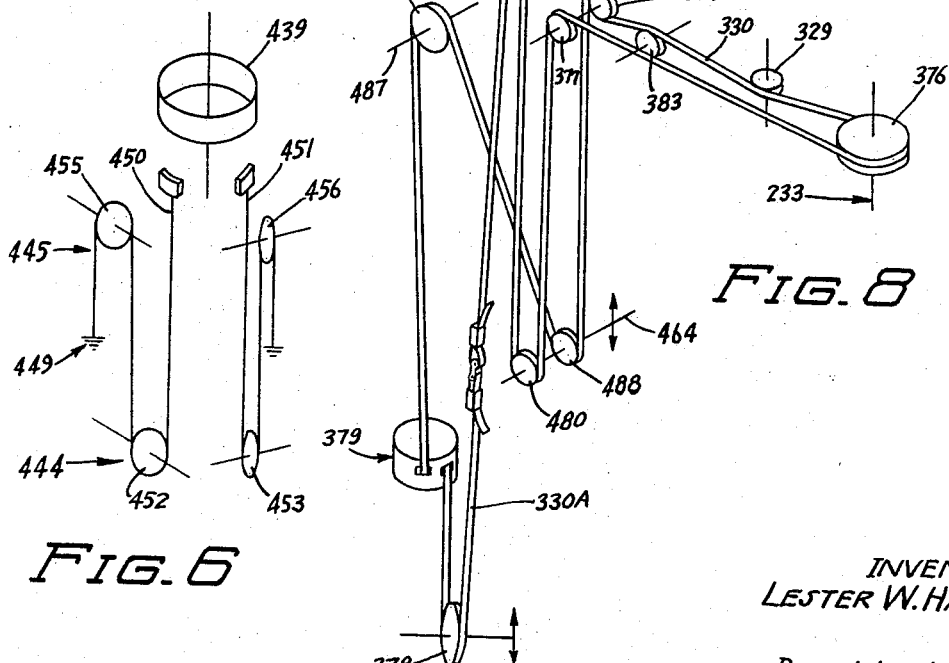

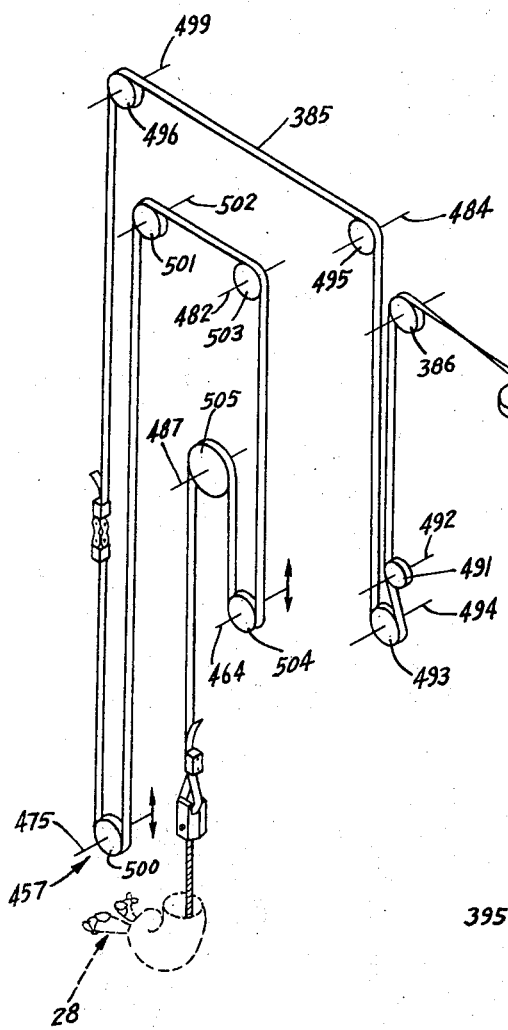
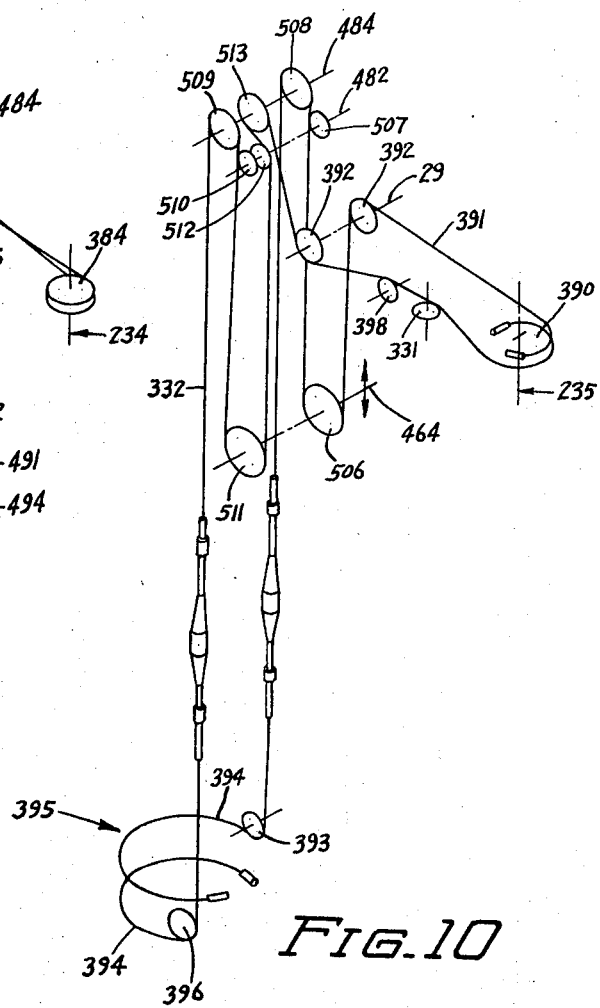
FIG. 9
FIG. 10

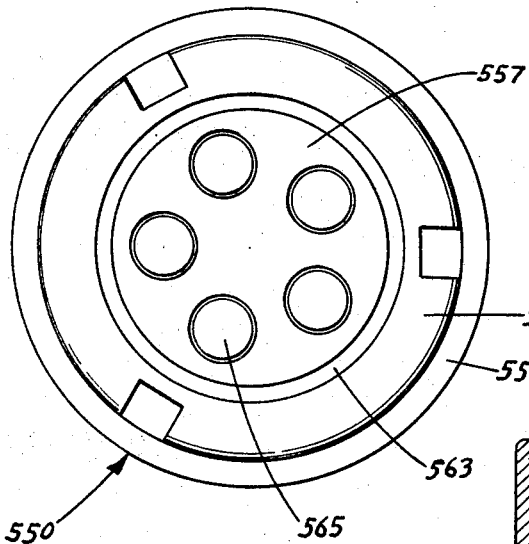
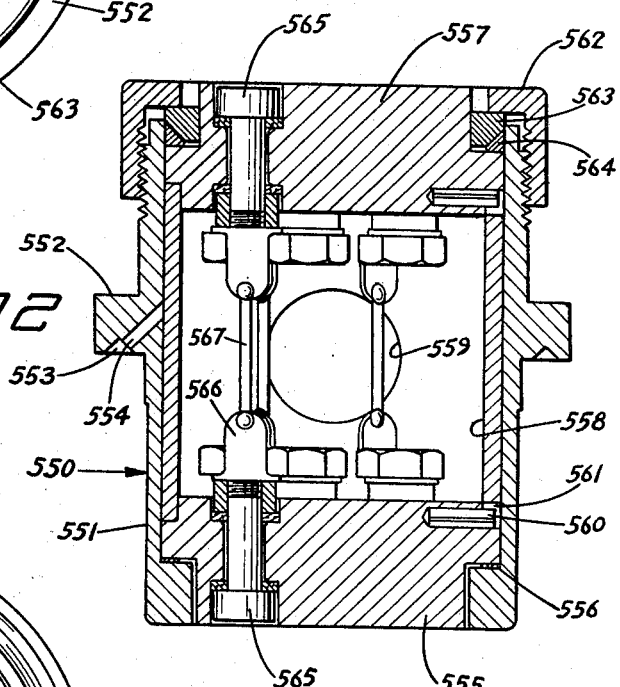
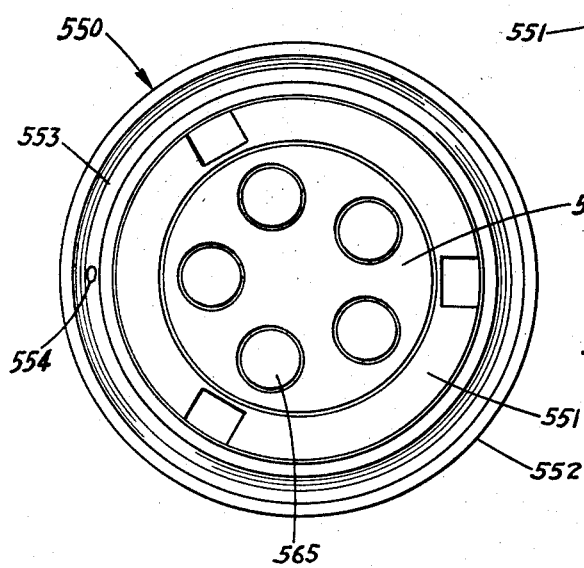

3,425,569
EXTENDED REACH SEALED MANIPULATOR
Lester W. Haaker, Red Wing, Minn., assignor to Central Research Laboratories, Inc., Red Wing, Minn., a corporation of Minnesota
Filed Oct. 28, 1966, Ser. No. 590,274
U.S. Cl. 214—1                 13 Claims
Int. Cl. B25j 3/00

This invention relates generally to remote control manipulators of the type by which movements of a handle engaged by an operator are reproduced in a claw or grasper engaging an article to be manipulated and spaced from the operator on the opposite side of a protective barrier wall. More particularly, the present invention relates to a sealed master-slave remote control manipulator adapted to function between differing environments separated by a tight sealed protective barrier and whose slave arm has an extended reach.

Introduction

In United States Patent No. 3,164,267 issued Jan. 5, 1965, in which I am a co-patentee, there is shown a sealed manipulator which is adapted for use, for example, in high level alpha-gamma hot cells, in cells requiring complete atmosphere control for handling pyrophoric or otherwise atmosphere sensitive material, in cells handling highly toxic gaseous or airborne particulate materials under circumstances involving risk of dissemination by explosion or other accident, or similar installations where it is desirable or imperative that the operator be in an environment completely sealed from the environment in which the slave arm of the manipulator functions.

The sealed master-slave remote control manipulator according to that patent functions to provide sensitive mechanical master-slave manipulation with reasonable load handling capacity through a barrier under conditions demanding ultimate separation of the operator from the environment in which the slave arm performs. This result is acomplished by the conversion of all manipulator motions to pure rotary motions which are transmitted from the master arm mechanism to the slave arm mechanism through double rotary mechanical seals between them. The manipulator is divided into three separate standardized subassemblies. These are the master arm, the slave arm and the seal tube assemblies. The seal tube assembly is mounted in a horizontal tube in the protective barrier and is statically sealed therein. Each movement of the master arm produces a corresponding movement of the slave arm.

In United States Patent No. 3,065,863, issued Nov. 27, 1962, there is shown a master-slave manipulator in which the slave arm can be lengthened independently of the master arm. This made it possible for the reach of the slave arm of a conventional manipulator to be extended with respect to the master arm while the master arm is maintained in operating position at any level of extension. The manipulator of this patent, however, is confined to use under circumstances in which the environments on opposite sides of the barrier wall are in communication and motions are transmitted by means of the conventional system of flexible cables and tapes extending through the barrier wall.

It is the object of the present invention to provide a sealed remote-control master-slave manipulator in which movements of the master arm produce movements of the slave arm through a sealed barrier separating the environments of the master and slave arms and in which the slave arm may be lengthened independently of the master arm to extend the reach of the slave arm while maintaining the sealed barrier separating the environments.

Broadly stated, the extended reach remote control master-slave manipulator according to the present invention, adapted for operation through a barrier wall separating different environments, comprises a pivoted master arm assembly adapted to be positioned on one side of a barrier wall, a pivoted slave arm assembly adapted to be positioned on the other side of the barrier wall, and a seal tube assembly adapted to extend through the barrier wall and be sealed therein, said seal tube assembly including a closed wall member separating the environments, a plurality of rotary mechanical seals extending through the closed wall of said seal tube assembly and interconnecting said master and slave arm assemblies, the manipulator being further characterized by the slave arm including an intermediate independently extendable telescoping tube by which the slave arm may be lengthened relative to the master arm, one end of each of said rotary mechanical seals being responsive to manipulator motions of the master arm, said rotary mechanical seals being adapted to transmit said motions to the opposite end of said rotary mechanical seals, manipulator movements in the slave arm at any extended position being responsive to rotation of said rotary mechanical seals.

The drawings

The extended reach sealed manipulator according to the present invention is illustrated in the accompanying drawings in which like numerals refer to corresponding parts and in which.

FIGURES 3A and 3B, to be viewed and considered together, show an isometric front elevation of component elements of the slave arm in separated or exploded form for clarity and better understanding.

Figure 4B:
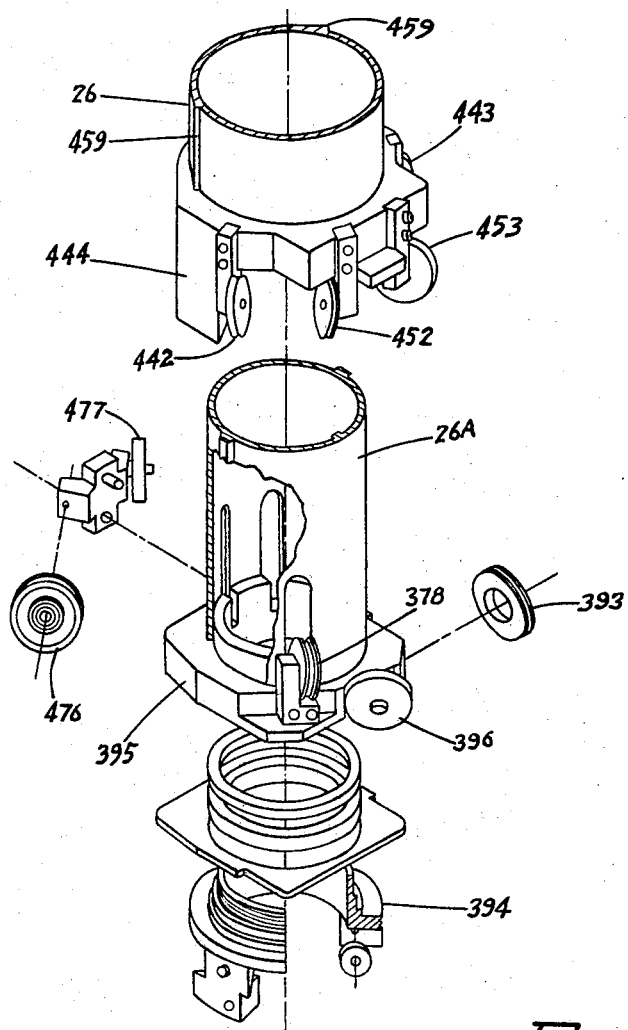
Figure 11:
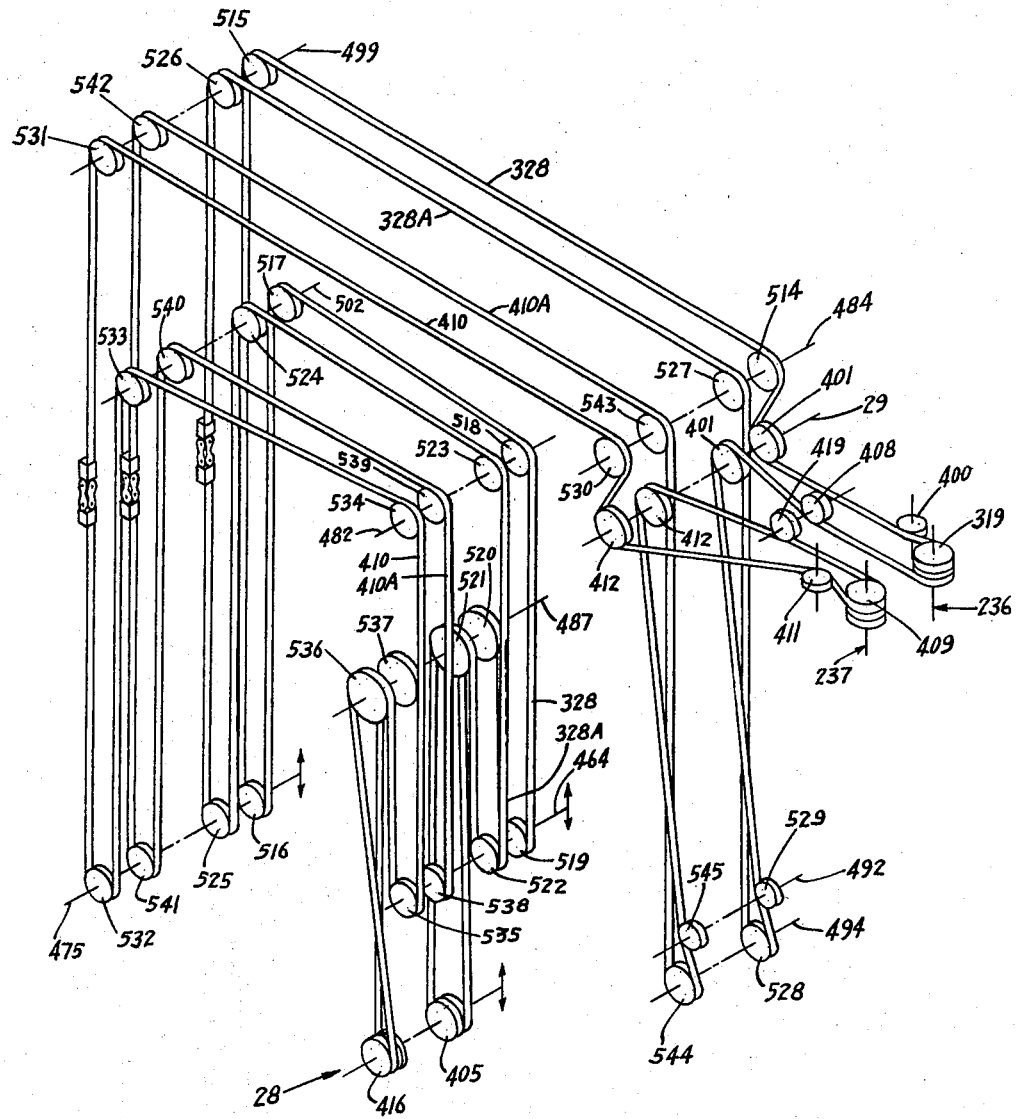

FIGURES 4A and 4B, to be viewed and considered together, show an isometric rear elevation of the slave arm showing other component elements in separated form for clarity and better understanding;

FIGURE 5 is a schematic perspective view showing the drive means for the intermediate tube of the slave arm by which the reach of the slave arm is extended;

FIGURE 6 is a schematic perspective view showing the independent counterweight system for the intermediate extension tube;

FIGURE 7 is a schematic perspective view showing the manner in which the slave arm is independently counterbalanced to compensate for movement of the slave arm (apart from extended reach) in response to similar movement of the master arm;

FIGURE 8 is a schematic perspective view showing how vertical movement (or Z motion) in the slave arm is accomplished through a rotary seal in response to corresponding motion or movement of the master arm;

FIGURE 9 is a schematic perspective view showing how the tongs carried by the slave arm are opened and closed in response to opening and closing movements of the handle on the master arm transmitted through a rotary seal;

FIGURE 10 is a schematic perspective view showing azimuth means by which rotation of the tongs of the slave arm about the longitudinal axis of that arm is accomplished in response to similar movement of the handle of the master arm transmitted through a rotary seal;

FIGURE 11 is a schematic perspective view showing elevation and twist means by which rotation of the tongs unit on the slave arm about its own two axes is accomplished in response to coresponding movement or rotation of the handle of the master arm transmitted through a rotary seal;

FIGURE 12 is an elevation, in section, of one form of seal package assembly by which electric power may be transmitted from the master arm to the slave arm to cause relative extension of the slave arm;

FIGURE 13 is a top plan view of the seal package of FIGURE 12 showing that end which extends into the cell enclosing the slave arm; and FIGURE 14 is a plan view of the bottom end of the seal package through which electrical contact is made by the master arm.

The structure of the master arm, the seal tube, the transfer plates, the rotary seals and much of the slave arm are identical as between the manipulator according to the present invention and that illustrated and described in detail in Patent No. 3,164,267. Accordingly, the disclosure of that patent is incorporated herein by reference to the extent necessary to provide the environmental setting for the present invention. Illustration of those parts and description of those functions which are identical as between the manipulators are not duplicated here. So far as feasible identical numbers are used to identify the same parts.

Throughout this application the manipulator is described and illustrated in terms of a single horizontal support with a single master arm and a single slave arm. It is to be understood, however, that in virtually all instances the manipulators are employed in spaced pairs so that the operator, by the use of two master control arms, is able to manipulate two slave arms in order to reproduce the action of a pair of hands in the remote area on the opposite side of the barrier wall.

Figure 1:
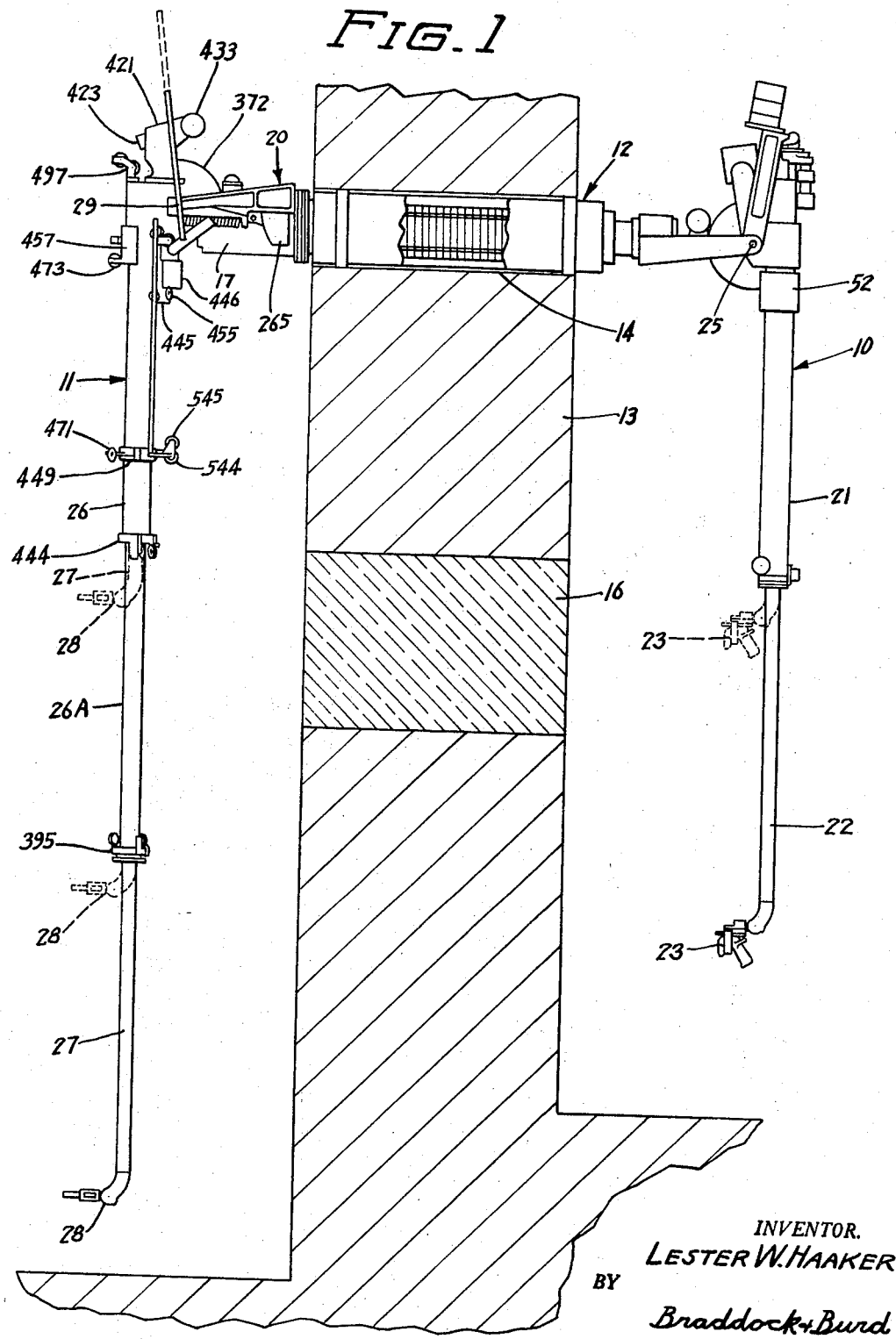
FIGURE 1 is an elevation, partly in section and partly broken away, showing the subassemblies of the remote control manipulator of the present invention mounted in a protective barrier wall and shown in maximum extension in full lines and at intermediate extension stages in broken lines.

General arrangement of parts (Figure 1)

Referring now to the drawings, and particularly to FIGURE 1, the extended reach sealed master slave manipulator according to the present invention comprises generally a master arm assembly indicated generally at 10, a slave arm assembly indicated generally at 11, and a seal tube assembly indicated generally at 12. The seal tube assembly 12 functions as a tubular horizontal support for the master and slave arms and extends through a generally vertical barrier or shielding wall 13 being mounted therein in a horizontal tube 14 secured so as to be structurally integral with the wall. The mounting tube 14 is provided with a finely finished bore. The seal tube is statically sealed therein by means of a plurality of mechanically expandable seal rings to form a lock seal which may be pressurized and continuously monitored.

The thickness of the wall 13 and the length of the seal tube assembly and the associated mechanism of the master arm assembly which fits therein are dependent upon the type of environment against which the wall forms a barrier. If the wall is to shield an operator from radioactive emanations the wall must necessarily be constructed of radiation absorbing material and be relatively thick. The wall is provided with a window 16 of approximately the same thickness as the wall and formed, for example, in the case of a radiation barrier, of laminated plate glass.

The master arm assembly 10, the slave arm assembly 11, and the seal tube assembly 12 are all completely separable units. These units are standardized and are interchangeable with different corresponding units in the event of failure of contamination of one or two of these units making up the manipulator, without the necessity of replacing all of the manipulator units. In normal non-operating position the master arm 10 and the slave arm 11 are balanced to hang generally vertically. The master arm is in a safe area to the right side of the wall 13, as viewed in FIGURE 1, and the slave arm is in an environment to the left of the wall, as viewed in FIGURE 1, from which the operator is shielded. The end of the seal tube 12 which communicates with the safe area in which the master arm is located is open and communicates with the environment of the operator. The opposite ends of the seal tube is closed.

That closed end of the seal tube which extends into the environment of the slave arm is provided with a transfer plate, indicated generally at 17, carrying a plurality of double rotary seal cartridges or packages housing sealed motion transfer shafts by which motions of the master arm are transmitted to the slave arm. Each transfer shaft housed in a seal cartridge is provided with couplings at both ends. The lower couplings of the transfer units are on the bottom face of the seal tube transfer plate and couple with corresponding elements in a master transfer plate. The upper couplings are exposed to the slave compartment and couple with corresponding elements in a slave transfer plate, indicated generally at 20, which is an integral part of the slave arm assembly and is positioned at the upper end thereof.

The master arm (FIGURE 1)

The master arm includes an elongated trunk tube 21 and a boom tube 22 of lesser diameter fit telescopically into the trunk tube and adapted to move longitudinally with respect to the trunk tube. The lower end of the movable boom tube carries a wrist joint and handle or gripper means, indicated generally at 23, by means of which the operator controls grasper or tong means on the slave arm. The details of construction and operation of the wrist joint and handle means are described generally in United States Patent No. 2,764,301 issued to Goertz et al. on Sept. 25, 1956 and accordingly are not repeated here.

The master arm assembly includes a substantial horizontal portion carrying the master arm transfer assembly at its free extremity and adapted to fit into the seal tube assembly 12. The generally vertical boom tube and trunk tube components of the master arm are pivotally connected to the through tube portion of the master arm at 25 so as to permit relative angular movement between the generally vertical and generally horizontal components of the master arm assembly.

Figure 2:
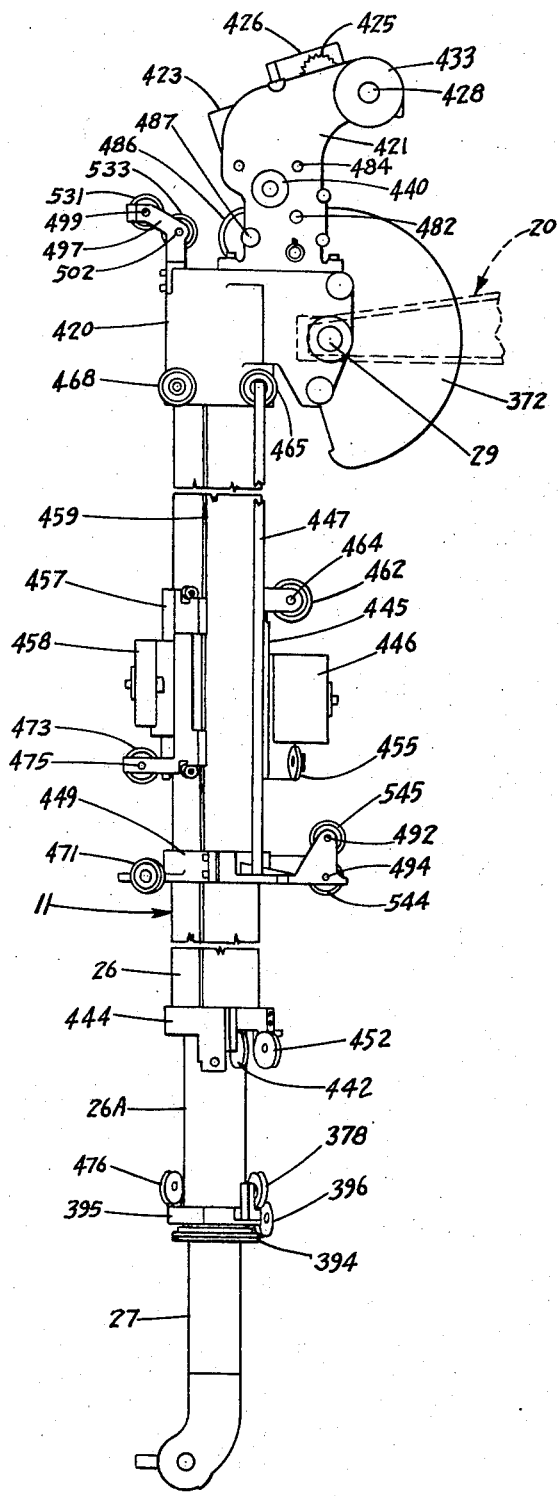
FIGURE 2 is an elevation of the slave arm subassembly.

The slave arm (FIGURES 1 and 2)

The slave arm includes an elongated trunk tube 26, an intermediate tube 26A of lesser diameter fit telescopically into the trunk tube and adapted to move longitudinally with respect to the trunk tube in response to independent drive means, as described in detail hereinafter, and a boom tube 27 of lesser diameter fit telescopically into the intermediate tube and adapted to move longitudinally with respect to the intermediate tube in response to similar movement of the boom tube 22 of the master arm. The lower end of the movable slave arm boom tube carries wrist joint and tong means, indicated generally at 28, whose movement is controlled by the operator manipulating the handle or gripper means 23 on the master arm. The slave arm is pivotally connected at 29 to the slave transfer plate 20 so as to permit angular movement of the slave arm corresponding to similar movement of the master arm.

Extension drive system
(FIGURES 1, 2, 3A and B, 4A and B, and 5)

A slave pivot body 420 (to which the slave trunk tube 26 is secured) is pivotally secured about the axis of pivot 29 to the slave transfer plate 20. A pair of spaced apart extension drive support brackets 421 and 422 are mounted on top of the pivot body casting 420. An extension drive actuator, such as an electric motor 423, is suspended from a bar support 424 which bridges the drive supports 421 and 422. An output drive gear 425 is driven by the actuator through a gear reduction box 426. Gear 425 meshes with gear 427 fixed to shaft 428 which is journalled for rotation in the arms of extension drive supports 421 and 422.

It will be noted that the actuator, bar support, gear box and actuator drive gear may be easily removed as a unit and replaced, simply by removing four screws and disconnecting an electrical connection. The actuator assembly may then be lifted free, lifting gear 425 out of engagement with gear 427 and replaced with an identical unit. Replacement of the actuator may be necessary, for example, in the event that the electrical characteristics of the motor become altered as a result of intense radiation, or the like.

Shaft 428 carries two pairs of spaced apart spirally grooved cable drums. The inner pair of drums 429 and 430 carry cables 431 and 432, respectively, which are wound in one direction about the drums. Outer drums 433 and 434 carry cables 435 and 436, respectively, which are wound about the drums in the opposite direction. Cables 431 and 432 extend over idlers 437 and 438, respectively, which are journalled for rotation on the inside surfaces of extension drive supports 421 and 422, respectively, and then extend downwardly through pivot body 420 to suitable anchorages in extension tube carriage 439 which is affixed to the top end of extension tube 26A.

Cables 435 and 436 extend over idlers 440 and 441, respectively, which are journalled for rotation on the outside surfaces of extension drive supports 421 and 422, respectively, and then extend downwardly along the outside surface of trunk tube 26 to idlers 442 and 443, respectively, which are carried by extension tube guide bracket 444 (which is secured to the lower end of trunk tube 26) and thence upwardly inside of trunk tube 26 to suitable anchorages in extension tube carriage 439. Tensioning means are included so that the loop of cable between each pair of oppositely acting take-up drums may be maintained taut at the proper tension.

In FIGURES 12 to 14 there is shown one means by which electrical connection may be made through the transfer assembly 17 where space has been provided at 238 for the installation of additional transfer assemblies. The seal package assembly indicated generally at 550 is in the form of a cylindrical tubular housing 551 having an outwardly extending flange 552 located intermediate of its ends. This housing is adapted to seat in a recess in the transfer assembly 17 and be sealed therein as described in detail in the aforesaid Patent No. 3,164,267. The bottom face of flange 552 is desirably provided with an annular groove 553 and channel 554 extending from the groove through the housing wall for continuous gas monitoring of the seal package as described in said patent.

A circular contact plate 555 having an outwardly extending flange seats on an inwardly extending flange in the bottom of housing 551. A sealing washer 556 maintains a gas tight seal when compressed in the assembled package. A similar contact plate 557 is disposed in the upper end of the housing. The contact plates are maintained spaced apart by a sleeve 558 fit within the housing. An opening 559 in sleeve 558 allows free communication with the interior of the housing for the monitoring gas. The contact plates are maintained in alignment by means of pins 560 engaging slots 561 in the ends of the sleeve. The assembly is secured together by means of an internally threaded retainer ring 562 engaging external threads on the top end of the housing. The retainer bears against an adapter ring 563 which compresses a gasket 564 against the flange of upper contact plate to maintain a gas tight seal and hold the entire assembly together.

Each contact plate has a plurality of contact screw assemblies 565 sealed therein with suitable washers and gaskets and extending through the plate. The inside end of each contact screw assembly is provided with a solder lug 566 to which wires 567 are secured to establish contact between corresponding contact screws of the upper and lower contact plates. Mating members in the master and slave transfer plates make contact with the opposite ends of the seal package for the transmission of electrical current and signals from the master arm to the slave arm.

A mechanical actuator may be substituted for electrical actuator 423 and gear box 426. The extension motion may then be transmitted from the master arm to the slave arm mechanically through a double rotary seal transfer assembly in the same manner as the other manipulator motions. Means similar to those illustrated in FIGURES 29 and 31 of the aforesaid patent may be adapted to this purpose. The actuation means at the master arm may be electrical or mechanical, as desired.

Actuator 423 can rotate shaft 428 in either direction. It will be readily seen by reference to the extension drive schematic (FIGURE 5) that as the shaft is rotated in a clockwise direction cables 435 and 436 are wound about take-up drums 433 and 434, respectively, and at the same time a corresponding length of cables 431 and 432 is unwound from drums 429 and 430, respectively. In this manner the intermediate extension tube 26A is driven downwardly and extends telescopically outward from the bottom edge of trunk tube 26 carrying boom tube 27 with it. By rotating shaft 428 in the opposite direction the reverse effect is achieved and the extension tube is retracted. It will be noted that the intermediate tube 26A is extended and retracted independently of any other motion of the manipulator.

Actuator 423 is electrically controlled by the operator from the master arm side of the barrier wall. The electrical connection may be made either through the transfer assembly 17 or may be made directly through the barrier wall. In either instance, no problems exist with maintenance of a proper seal through which the electric power is passed.

*Extension counterweight*
*(Figures 1, 2, 3A and B, 4A and B, and 6)*

The extension or intermediate tube 26A is independently counterbalanced as follows. An extension counterweight carriage body 445 carrying a counterweight 446 of appropriate mass is mounted for longitudinal movement on a track composed of a pair of rods 447 and 448 which are supported at their upper ends in pivot body 420 and at their lower ends in trunk tube bracket 449. Trunk tube bracket 449 is secured to trunk tube 26 spaced from the bottom end thereof. Rods 447 and 448 are parallel to and spaced slightly from the outer surface of trunk tube 26.

A pair of cables 450 and 451 extend from anchorages in the extension tube carriage 439 downwardly in the space between trunk tube 26 and intermediate tube 26A to idlers 452 and 453, respectively, which are secured to extension tube guide bracket 444 fixed to the lower most end of trunk tube 26. The cables 450 and 451 then pass upwardly along the outside wall of trunk tube 26 to pulleys 455 and 456, respectively, which are journalled in the bottom end of extension counterweight bracket 445, and then back downwardly to anchorages in trunk tube bracket 449.

Thus, it will be seen that as intermediate tube 26A is retracted (moved vertically upward in schematic view, FIGURE 6) the tensioning force exerted on cables 450 and 451 by the extension tube carriage 439, in which they are anchored, is transmitted to pulleys 455 and 456 to cause the extension counterweight bracket 445 to be moved in the opposite direction and at one-half the speed. In this manner the slave arm is maintained in balance regardless of the position of the intermediate tube, whether extended or retracted or in some intermediate position.

*Z Motion counterweight system*
*(Figures 1, 2, 3A and B, 4A and B, and 7)*

The slave arm boom tube 27 fits telescopically within intermediate tube 26A which in turn fits telescopically within slave arm trunk tube 26, as described and shown. In order that the boom tube will remain in any position relative to the intermediate tube and may be retracted or extended with minimum exertion on the part of the operator, it is counterbalanced, as shown schematically in FIGURE 7. At the same time, the length of the paths of travel of tapes and cables associated with the slave arm boom tube and moved with that tube is maintained uniform by compensating for the distance through which the boom tube is moved.

The slave arm is counterbalanced to compensate for varying positions of the slave boom tube 27 as follows. A Z motion counterweight carriage body 457 carrying a Z motion counterweight 458 of appropriate mass is mounted to move longitudinally on rollers on a track formed by ridges 459 extruded in trunk tube 26. The Z motion counterweight carriage is supported by a pair of tapes 460 and 461, one end of each of which is anchored in pivot body 420. The tapes extend downwardly therefrom around pulleys 462 and 463, respectively, which are carried by extension counterweight carriage 445 for rotation about axis 464.

The tapes 460 and 461 then pass up and over a pair of idlers or guide pulleys 465 and 466, respectively, mounted for rotation on the outside of pivot body 420 and thence to companion idlers 468 and 469, respectively, similarly mounted on pivot body 420 but spaced on the forward side of the slave arm away from the barrier wall. The tapes then pass downwardly along the outside of the trunk tube 26 to idlers 471 and 472, respectively, which are carried by trunk tube bracket 449, and then upwardly to and around idlers 473 and 474, respectively, which are carried in a bracket on Z motion counterweight carriage 457 for rotation about axis 475.

From the Z motion counterweight carriage the tapes 460 and 461 extend downwardly to idlers 476 and 477, respectively, carried by azmiuth assembly 395 carried at the lowermost end of intermediate tube 26A, and then pass into the space between the intermediate tube and boom tube 27. The tapes finally pass upwardly to anchorages in boom carriage 379 carried by the upper end of boom tube 27.

It will be noted that, as the slave boom tube 27 is moved vertically, extended or retracted, in response to corresponding movements of the master boom tube by the operator, as described in detail hereinafter, the Z motion counterweight carriage 457 is moved in the opposite direction and at one-half the speed. This is true whether the intermediate extension tube 26A is extended or retracted, by virtue of the tapes extending around idlers carried by the extension counterweight carriage.

*Z Motion of the boom tube*
*(Figures 1, 2, 3A and B, 4A and B, and 8)*

The transfer of the extending and retracting movement, or Z motion, of the master boom tube to the slave boom tube is simultaneous with, but independent of, movement of the slave arm counterbalance system. As the master boom tube is lowered, that is, extended from the trunk tube a tape is subjected to increased tension which is transmitted to the master transfer drum of a seal transfer assembly, indicated schematically at 233 in FIGURE 8, as fully described and explained in Patent No. 3,164,267, to cause the transfer drum to rotate in a counterclockwise direction as viewed in the schematic illustration. The same counterclockwise rotation is imparted to slave arm transfer drum 376 through the seal transfer assembly 233.

When transfer drum 376 is rotated in a counterblockwise direction, tape 330A, one end of which is attached to the take-up drum, is further wound about the drum. This force exerted on tape 330A is transmitted through the tape, which passes around one groove of double pulley 377 of a pivot pulley bank whose axis lies on pivot axis 29. That tape then extends downwardly and around idler 480 carried by extension counterweight carriage 445 and journalled to rotate about axis 464 and thence upwardly outside of trunk tube 26 to idler 481 journalled between extension drive supports 421 and 422 for rotation about axis 482.

Tape 330A extends then up and over idler 483, also mounted between the extension drive supports and journalled for rotation about axis 484. Idlers 481 and 483 are members of fixed banks of pulleys centered over the pulley bank (of the extension counterweight carrier 445) which rotates on axis 464. The tape 330A then extends downwardly along the outside wall of trunk tube 26 to idler 378 (carried by azimuth assembly 395 on the bottom end of intermediate tube 26A) which passes it into the space between the intermediate tube and boom tube 27 where the tape extends upwardly and is anchored to the boom tube carriage 379.

The force exerted by tape 330A at the top of the slave arm tube causes the boom tube to become extended at the same rate and for the same distance as the master arm boom tube is moved by the operator. The downward movement of the boom tube in turn exerts force on tape 330, one end of which is also anchored to boom tube carriage 379. This force is transmitted through tape 330 which passes over idler 486 in a pulley bank fixed at the top of the trunk tube for rotation about axis 487; then down along the outside of the trunk tube to idler 488 carried by the extension counterweight carriage for rotation on axis 464; then up and around idler 489 between the extension drive supports on axis 482; up and over idler 490 journalled between the extension drive supports on axis 484; and then down and around the other groove of double pivot pulley 377 and in the opposite direction.

Tape 330 is guided by idlers 383 and 329 to the transfer drum 376 around which it extends in the opposite direction from tape 330A and to which its end is secured. Thus, as tape 330A is wound further about drum 376 as it rotates in a counterclockwise direction, tape 330 is unwound to the same extent.

*Tong motion*
*(FIGURES 1, 2, 3A and B, 4A and B, and 9)*

The squeezing motion of the operator on the handle means 23 of the master arm is transmitted to the tong means 28 on the slave arm. As fully described in the aforementioned Haaker et al. Patent No. 3,164,267, squeezing of the handle 23 through direct linkage exerts a force on a tape which causes the tape to unwind from a drum comprising part of a double seal transfer assembly, indicated schematically at 234 in FIGURE 9, and causes the drum to be rotated in a clockwise direction as viewed in the schematic drawing. This clockwise rotation is transmitted through the double seal transfer assembly to a slave transfer drum 384.

A tape 385 is wound about drum 384 in the opposite direction from which the master tape is wound about the master transfer drum. When drum 384 is rotated in a clockwise direction, the tape 385 is wound further about the drum. The force exerted on tape 385 is transmitted through the tape which passes over a pulley 386 in the slave pivot pulley bank, down the outside of the trunk tube 26 to an idler 491 journalled in trunk tube bracket 449 to rotate about axis 492 and thence around idler 493 journalled in the same bracket to rotate about axis 494. Tape 385 extends then upwardly and around idler 495 journalled between the extension drive supports to rotate on axis 484.

The tape then extends forward to an idler 496 journalled between a pair of upwardly and forwardly extending brackets 497 and 498 mounted on the top of the pivot body 420. Idler 496 is journalled to rotate about axis 499. The tape then extends downwardly along the outside forward surface of trunk tube 26 to an idler 500 journalled to rotate on axis 475 in Z motion counterweight carriage 457 and then back up along the outside of trunk tube 26 to idler 501 journalled to rotate on axis 502 between brackets 497 and 498.

The tape 385 then extends rearwardly to idler 503 journalled between the extension drive supports to rotate on axis 482 and then downwardly along the rear surface of trunk tube 26 to idler 504 journalled in the extension counterweight carriage to rotate about axis 464. The tape then extends back upwardly to idler 505 journalled to rotate on axis 487 at the top of the trunk tube and then down through the center of the boom tube 27 to the wrist joint at the bottom end thereof and to the tong mechanism 28.

Through direct linkage as described in the aforesaid Goertz et al. patent, the force transmitted by tape 385 causes the tong elements to close in order to grasp an object to be acted upon. When the operator releases the handle, spring means automatically reverses the direction of rotation of the master transfer drum of the transfer assembly 234 to wind up the master arm tape and take up any slack. The counter rotation is transmitted through the sealed transfer assembly to rotate drum 384 to release the tension on tape 385. Spring means in the tong assembly then open the tongs.

*Azimuth motion*
(FIGURES 1, 2, 3A and B, 4A and B, and 10)

The manner in which rotation of the master arm boom tube about its longitudinal axis is transmitted to cause a corresponding rotation of the slave arm boom tube about its longitudinal axis is as follows. If the master boom tube is rotated in a clockwise direction this clockwise rotation is transmitted through the double seal transfer assembly, indicated schematically at 235 in FIGURE 10, to a slave transfer drum 390.

As drum 390 is rotated in a clockwise direction, cable 391, one end of which is attached to drum 390, is wound about the drum exerting force on the cable. This force is transmitted through the cable which follows a path over one groove of double pivot pulley 392, down along the rearward outside surface of trunk tube 26 to idler 506 carried by extension counterweight carriage 445 to rotate on axis 464 and then upwardly around idler 507 journalled between the extension drive supports to rotate on axis 482; over idler 508 journalled between those supports to rotate on axis 484 and then downwardly along the rear outside surface of the trunk tube to idler 393 to a double grooved horizontally disposed drum 394 forming part of the slave arm azimuth subassembly indicated generally at 395.

The end of cable 391 is secured to the drum 394 and the force transmitted through the cable causes the cable to unwind to rotate drum 394 in a clockwise direction and at the same time to rotate the slave arm boom tube 27 about the longitudinal axis of the slave arm in the same clockwise direction.

As cable 391 unwinds from drum 394, cable 332 (which is wound around the drum in the opposite direction) is wound further onto the drum. The end of cable 332 is attached to the drum and the winding of the cable around the drum applies force to the cable which is transmitted through the cable as it passes around idler 396 on the slave arm azmuth subassembly 395 upwardly to idler 509 in the upper pulley bank between the extension drive supports journalled to rotate on axis 484, around idler 510 on the lower pulley bank between those supports journalled to rotate on axis 482 and downwardly to idler 511 in the extension counterweight carriage rotatable about axis 464.

The cable then extends upwardly again to idler 512 in the lower pulley bank between the extension drive supports rotatable about axis 482, up and around idler 513 on the upper pulley bank between those supports rotatable on axis 484 and then back down and around the other groove of double pivot pulley 392 (and in the opposite direction from cable 391); over and around idlers 398 and 331 to drum 390 around which it is wrapped in the direction opposite from cable 391. Thus, as cable 391 is wound further about drum 390, cable 332 is unwound to the same extent.

*Elevation and twist motions* (FIGURES 1, 2, 3A and B, 4A and B, and 11)

The system by which elevation and twist motions are transmitted from the handle 23 to the tong 28 is as follows. A drum associated with the handle mechanism is rotated in response to manipulation of the handle by the operator through direct gearing, as described in the aforesaid Goertz et al. patent. As that drum is rotated in a counterclockwise direction as viewed in the schematic illustration (FIGURE 11) a tape is wound about that drum. This exerts force which is transmitted to cause the master drum of a seal transfer assembly, indicated generally at 236, to rotate in a clockwise direction.

The clockwise rotation of the master transfer drum is transmitted to slave transfer drum 319 which is caused to rotate in the same clockwise direction. As this occurs, tape 328 is caused to be wound onto the drum exerting tension on the tape which is transmitted through the tape along its path of travel. Tape 328 extends around idler 400; under and around one groove of double pivot pulley 401; up and over idler 514 in the upper pulley bank between the extension drive supports journalled for rotation about axis 484; forward to idler 515 on the pulley bank supported between brackets 497 and 498 for rotation about axis 499 and down along the forward outside surface of trunk tube 26 to idler 516 journalled to rotate on axis 475 in Z motion counterweight carriage 457.

Tape 328 then extends upwardly to idler 517 journalled to rotate on axis 502 between brackets 497 and 498 at the top of the trunk tube; rearward to idler 518 journalled to rotate on axis 482 between the extension drive supports; down along the rear outside surface of the trunk tube to idler 519 journalled to rotate on axis 464 in the extension counterweight carriage; upwardly to idler 520 journalled to rotate on axis 487 at the top of the trunk tube and down to drum 405 of the tong mechanism to which the end is secured. The force transmitted by tape 328 causes drum 405 to be rotated in a counterclockwise direction corresponding in rate and extent of rotation to the rotation of the drum associated with the handle on the master arm.

Tape 328A extends around drum 405 in the opposite direction from tape 328. The end of tape 328A is attached to the drum. Thus, when the drum 405 is rotated in a counterclockwise direction (caused by the unwinding of tape 328) force is exerted by the drum on tape 328A to wind that tape further onto the drum. This force is transmitted by the tape along its path of travel up and over idler 521 journalled to rotate on axis 487 at the top of the trunk tube and then down and around idler 522 journalled to rotate on axis 484 in the etxension counterweight carriage 445.

Tape 328A then extends upwardly to idler 523 journalled to rotate on axis 482 between the extension drive supports; forwardly over idler 524 journalled between brackets 497 and 498 to rotate on axis 502 and then down and around idler 525 journalled to rotate on axis 475 in the Z motion counterweight carriage 457. Tape 328A then extends upwardly to idler 526 journalled to rotate on axis 499 between brackets 497 and 498; rearwardly to idler 527 journalled to rotate on axis 484 between the extension drive supports and down along the outside rear surface of the trunk tube to idler 528 journalled to rotate on axis 494 in trunk tube bracket 449. The tape then extends upwardly around idler 529 journalled to rotate on axis 492 in the same bracket and then up and over double grooved pivot pulley 401 (in the other groove and in the opposite direction from tape 328) under idler 408 to drum 319 where the tape is unwound to the same extent that it is wound on drum 405 in the tong mechanism.

Similarly the handle mechanism 23 includes a further drum around which a tape is wound and to which its end is secured. As that drum is rotated in a counterclockwise direction in response to manipulations of the handle by the operator through direct gearing, the tape is caused to be wound about the drum thereby exerting force on that tape. This force is transmitted to a master transfer drum comprising part of a rotary seal assembly indicated schematically at 237.

The counterclockwise rotation of that drum is imparted to a slave transfer drum 409 which is caused to rotate in the same counterclockwise direction. This exerts a pulling force on tape 410 which is transmitted along the path of the tape around idler 411 under and around one groove of double grooved pivot pulley 412 and then up and over idler 530 journalled for rotation about axis 484 in the upper pulley bank between the extension drive supports. Tape 410 then extends forwardly to idler 531 journalled to rotate on axis 499 between brackets 497 and 498; thence downwardly to idler 532 journalled to rotate on axis 475 in the Z motion counterweight carriage; back up to idler 533 journalled for rotation on axis 502 between brackets 497 and 498; rearwardly to idler 534 on axis 482 of the lower pulley bank between the extension drive supports; down to idler 535 on axis 464 in the extension counterweight carriage; back up to idler 536 in the fixed pulley bank at the top of the trunk tube on axis 487 and thence down to drum 416 to which the end of the tape is secured.

The pulling force exerted against tape 410 by transfer drum 409 causes the tape to wind around that drum and to unwind from drum 416 to the same extent. This causes drum 416 in the tong mechanism to rotate in a counter-clockwise direction corresponding to the counterclockwise rotation of the drum in the handle of the master arm. This rotation of drum 416 exerts a pulling force against tape 410A exerted through the tape in its path of travel upward and over idler 537 in the fixed pulley bank at the top of the trunk tube rotating on axis 487; down and around idler 538 rotatable on axis 464 in the extension counterweight carriage; up and over idler 539 in the lower pulley bank fixed between the extension drive supports and rotatable on axis 482 and forward to idler 540 rotatable on axis 502 between brackets 497 and 498.

Tape 410A then extends down to idler 541 rotatable on axis 475 in the Z motion counterweight carriage; upward to idler 542 in the upper pulley bank held between brackets 497 and 498 rotatable on axis 499; rearwardly to idler 543 rotatable on axis 484 between the extension drive supports; down and around idler 544 in the lower pulley bank of trunk tube bracket 449 rotatable on axis 494; around idler 545 in the upper pulley bank of the same bracket rotatable on axis 492 and then up and over double pivot pulley 412 (in the other groove and in a direction opposite from tape 410) and under idler 419 to drum 409 to which the end of the tape is attached. The pulling force exerted upon tape 410A causes that tape to unwind from the drum 409 as the drum rotates in a counter-clockwise direction.

It will be seen that the lengths of the motion transfer tapes and cables are self-adjusting to compensate for changes in the length of the slave arm caused by extension and retraction of the intermediate tube 26A, as well as by extension and retraction of boom tube 27. Each of the motion transfer systems has been described in connection with the schematic illustrations as moving in a single direction. The operation of the systems to accomplish movement in the opposite direction will be readily apparent. It will also be apparent that, in actual operation of the manipulator device, two or more of the motion systems will be in simultaneous but independent operation.

It is apparent that many modifications and variations of this invention as hereinbefore set forth may be made without departing from the spirit and scope thereof. The specific embodiments described are given by way of example only and the invention is limited only by the terms of the appended claims.

I claim:
1. In a remote control master-slave manipulator adapted for operation through a barrier wall separating different environments comprising a pivoted master arm assembly adapted to be positioned on one side of a barrier wall, a pivoted slave arm assembly adapted to be positioned on the other side of the barrier wall, and a seal tube assembly adapted to extend through the barrier wall and be sealed therein, said seal tube assembly including a closed wall member separating the environments, a plurality of rotary mechanical seals extending through the closed wall of said seal tube assembly and interconnecting said master and slave arm assemblies, one end of each of said rotary mechanical seals being responsive to manipulator motions of the master arm, said rotary mechanical seals being adapted to transmit said motions to the opposite end of said rotary mechanical seals, manipulator movements in the slave arm being responsive to rotation of said rotary mechanical seals, the improvement which consists in said slave arm being extendable independently of said master arm and comprising:
(A) a trunk tube, an intermediate tube fitted telescopically within said trunk tube and a boom tube fitted telescopically within said intermediate tube;
(B) drive means mounted on said slave arm assembly and connected to drive said intermediate tube;
(C) said drive means including an actuator operative in response to power transmitted from the master arm side of said barrier wall through transmission means sealed therein; and
(D) control means for said actuator mounted on said master arm assembly, said drive means being operable from the master arm side of said barrier wall independently from operation of said master arm.

2. A manipulator according to claim 1 further characterized in that counterweight means are provided longitudinally movable relative to said slave arm for counterbalancing said slave arm in its movements in response to movement of said master arm.

3. A manipulator according to claim 2 further characterized in that independent counterweight means are provided separately movable longitudinally relative to said slave arm to counterbalance said slave arm in response to extension of said intermediate tube.

4. A manipulator according to claim 3 further characterized in that said counterweight means for counterbalancing the slave arm in response to movement of the master arm includes:
(A) a carriage supporting a counterweight mounted external of said trunk tube on one side,
(B) a pulley bank carried by said carriage and longitudinally movable therewith,
(C) said carriage supported by at least one elongated flexible supporting element extending over said pulley bank from a fixed position adjacent the top of said trunk tube to a fixed position adjacent the top of said boom tube and exerting force on said carriage in response to movement of the boom tube,
(D) said carriage also supported by a plurality of elongated flexible linear motion transmission elements extending over said pulley bank from said mechanical seals to said boom tube to transmit motion thereto and exerting force in opposition to the force exerted by said supporting element, and
(E) said carriage being movable longitudinally in response to movement of said boom tube at one half the speed and in the opposite direction.

5. A manipulator according to claim 4 further characterized in that said independent counterweight means for counterbalancing said slave arm in response to extension of the intermediate tube includes:
(A) a carriage supporting a counterweight mounted external of said trunk tube on the opposite side, (B) a pulley bank carried by said carriage and longitudinally movable therewith, (C) said carriage engaged by at least one elongated flexible pull-down element extending over an idler on said carriage from a fixed position adjacent the bottom of said trunk tube to a fixed position adjacent the top of said intermediate tube, (D) said carriage supported by a plurality of elongated flexible linear motion transmission elements extending over said pulley bank from said mechanical seals to transmit motion to said boom tube and exerting force in opposition to said pull-down element, (E) said carriage being movable longitudinally in response to extension and retraction of said intermediate tube at one half the speed and in the opposite direction, and (F) said carriage in its longitudinal movement compensating for variations in length of said linear motion transmission elements caused by extension and retraction of said intermediate tube.

6. A manipulator according to claim 1 further characterized in that:

(A) a pair of spaced apart drive support brackets are disposed on top of said slave arm assembly, (B) said drive means includes an input gear through which said drive means is driven, (C) said drive means includes a motor unit having an output gear meshing with said input gear, (D) said drive motor unit is suspended between said brackets on a bridge member removably secured to said bracket, (E) easily disengageable fastening means are provided at each end of said bridge member whereby said drive motor unit is easily removable and replaceable, and (F) said output gear is disposed above said input gear whereby, when said drive motor unit is lifted on its bridge support, said gears become disengaged and the output gear of a replacement motor unit is readily engageable with the input gear.

7. A manipulator according to claim 1 further characterized in that said drive means includes:

(A) a shaft journalled for rotation adjacent the top of said slave arm assembly on an axis perpendicular to the plane defined by the longitudinal axes of said slave arm and said seal tube, (B) said shaft connected to be driven by said actuator, (C) at least two drums rotatable with said shaft, and (D) at least two elongated flexible linear motion transmission elements, one of which is anchored to and wrapped around one of said drums in one direction and extends to and is anchored to said intermediate tube, the other of which is anchored to and wrapped around the other of said drums in the opposite direction and extends to and is anchored to said intermediate tube to exert force in opposition to that exerted by said first linear motion transmission element upon rotation of said shaft.

8. A manipulator according to claim 7 further characterized in that said linear motion transmission elements are cables and said drums are spirally grooved, whereby the total length of cable extending from one drum to the intermediate tube and from the intermediate tube to the other drum is maintained substantially constant.

9. A manipulator according to claim 1 further characterized in that:

(A) said actuator is an electric motor, and (B) an electrical seal package extends through the closed wall member of said seal tube assembly electrically interconnecting said master and slave arm assemblies.

10. A manipulator according to claim 9 further characterized in that said electrical seal package comprises:

(A) tubular housing sealed in the closed wall member of said seal tube assembly, (B) a contact plate at each opposite end of said housing on opposite sides of said closed wall member, (C) a plurality of electrical contacts sealed in each of said contact plates, (D) electrical conductors interconnecting the contacts of one of said contact plates to the other.

11. A remote control master-slave manipulator for operation through a barrier wall separating different environments, said manipulator comprising:

(A) a pivoted master arm assembly to be positioned on one side of a barrier wall, (B) a pivoted slave arm assembly to be positioned on the other side of the barrier wall, and (C) a seal tube assembly to extend through the barrier wall and be sealed therein, (D) said seal tube assembly including a closed wall member separating the environments, (E) a plurality of rotary mechanical seals extending through the closed wall of said seal tube assembly and interconnecting said master and slave arm assemblies, (F) said rotary mechanical seals being responsive to manipulator motions of the master arm and manipulator movements in the slave arm being responsive to rotation of said rotary mechanical seals, (G) said slave arm being extendable independently of said master arm and including a trunk tube, an intermediate tube movable relative to said trunk tube and a boom tube movable relative to said intermediate tube;

(H) drive means mounted on said slave arm assembly and connected to drive said intermediate tube;

(I) said drive means including an actuator operative in response to power transmitted from the master arm side of said barrier wall through transmission means sealed therein;

(J) control means for said actuator mounted on said master arm assembly, said drive means being operable from the master arm side of said barrier wall independently from operation of said master arm;

(K) counterweight means longitudinally movable relative to said slave arm for counterbalancing said slave arm in its movements in response to movement of said master arm; and (L) independent counterweight means separately movable longitudinally relative to said slave arm to counter-balance said slave arm in response to extension of said intermediate tube.

12. A manipulator according to claim 11 further characterized in that:

(A) said actuator is an electric motor, and (B) an electrical seal package extends through the closed wall member of said seal tube assembly electrically interconnecting said master and slave arm assemblies.

13. A manipulator according to claim 12 further characterized in that said electrical seal package comprises:

(A) a tubular housing sealed in the closed wall member of said seal tube assembly, (B) a contact plate at each opposite end of said housing on opposite sides of said closed wall member, (C) a plurality of electrical contacts sealed in each of said contact plates, (D) electrical conductors interconnecting the contacts of one said contact plates to the other.

References Cited
UNITED STATES PATENTS
3,065,863 11/1962 Saunders.
3,261,480 7/1966 Haaker.

GERALD M. FORLENZA, *Primary Examiner.*

GEORGE F. ABRAHAM, *Assistant Examiner.*